Figure 1:
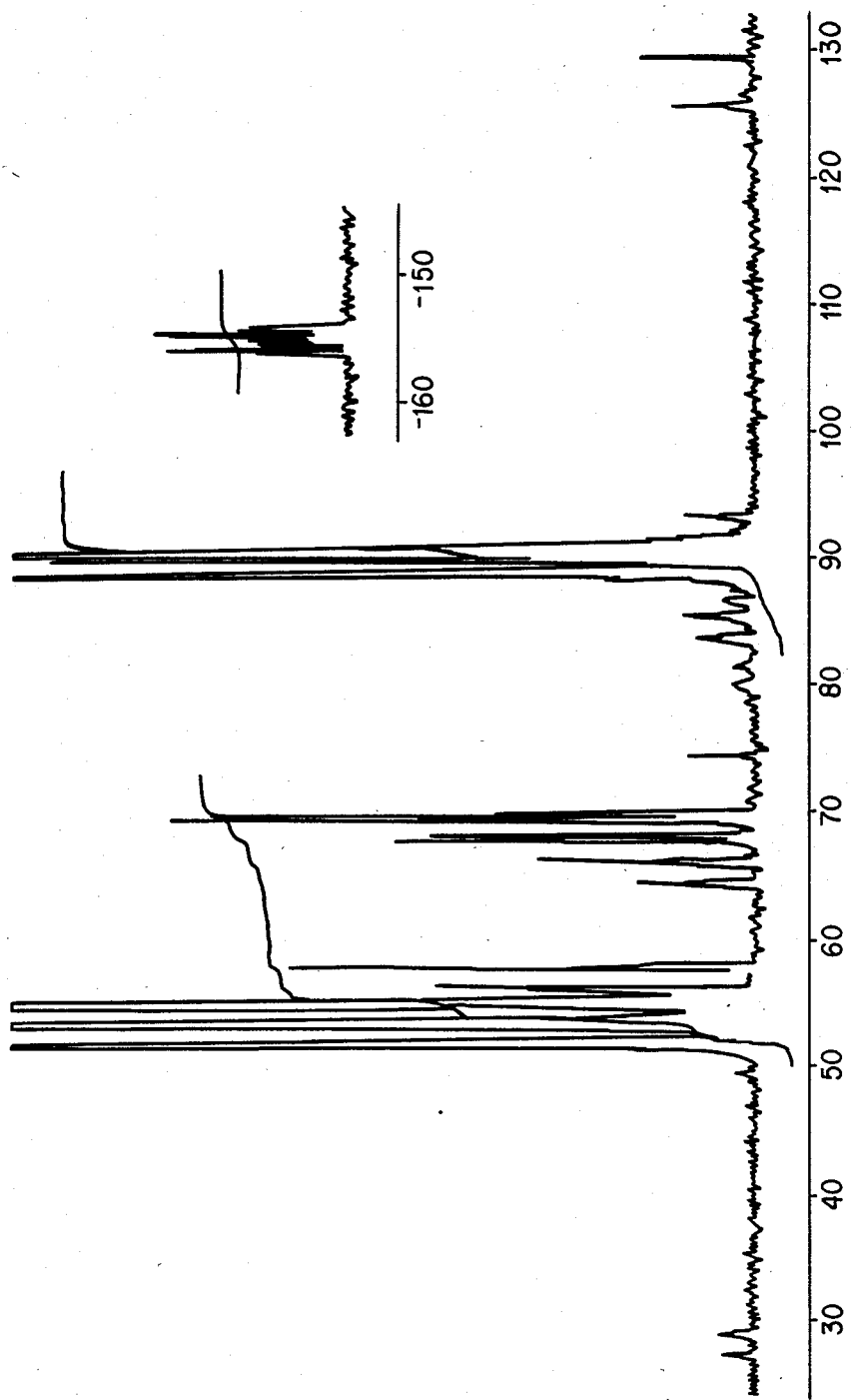

United States Patent [19]

Marchionni et al.

[11] Patent Number: 4,906,770

[45] Date of Patent: Mar. 6, 1990

[54] PERFLUOROPOLYETHERS HAVING MONO- AND BIS-HYPOFLUORITE END GROUPS

[75] Inventors: Giuseppe Marchionni; Anna Staccione, both of Milan, Italy

[73] Assignee: Ausimont S.p.A., Milan, Italy

[21] Appl. No.: 246,619

[22] Filed: Sep. 20, 1988

[30] Foreign Application Priority Data

Sep. 22, 1987 [IT] Italy ................................ 21979 A/87

[51] Int. Cl.$^4$ ............................................. C07C 69/62
[52] U.S. Cl. .................................................... 560/300
[58] Field of Search .......................................... 560/300

[56] References Cited

U.S. PATENT DOCUMENTS 3,755,405  8/1973  Gould et al. .................... 560/300

Primary Examiner—Mary C. Lee
Assistant Examiner—Robert C. Whittenbaugh
Attorney, Agent, or Firm—Stevens, Davis, Miller & Mosher

[57] ABSTRACT

Mono- or difunctional perfluoropolyethers with hypofluorite end groups, and a process for preparing them which comprises reacting a perfluoropolyether having at least one fluoroformate end group, or containing a peroxy group —O—CF$_2$OO—CF$_2$—O—, with fluorine in the liquid phase at a temperature ranging from −60° C. to 30° C., in the presence of UV radiation of a wavelength ranging from 200 to 500 nm.

3 Claims, 2 Drawing Sheets

PERFLUOROPOLYETHERS HAVING MONO- AND BIS-HYPOFLUORITE END GROUPS

DESCRIPTION OF THE INVENTION

This invention relates to perfluoropolyethers. More particularly the invention relates to mono- or difunctional perfluoropolyethers having hypofluorite end groups.

The invention relates furthermore to a process for preparing mono-hypofluorite or bis-hypofluorite perfluoropolyethers by reaction with fluorine, and in the presence of UV radiation, of perfluoroether compounds containing one or two fluoroformate end groups.

In another aspect, the invention relates to a process for preparing perfluoropolyethers having fluoroformate end groups utilized as precursors for obtaining the perfluoropolyethers having hypofluorite end groups.

In still another aspect, the invention relates to a process for preparing mono-hypofluorite and bis-hypofluorite perfluoropolyethers by treatment with fluorine, and in the presence of UV radiations, of perfluoropolyether precursors prevailingly containing the peroxy group $-OCF_2OOCF_2O-$.

The hypofluorite, i.e., compounds containing the fluoroxy group $-OF$, are per se known and are considered difficult to prepare owing to their instability.

The first compound of the perfluoroalkyl series, i.e., trifluoromethylhypofluorite, exhibits a higher thermal stability with respect to all the higher homologs for the preparation of whch such drastic and limiting conditions are necesary that no industrial application is practically possible.

U.S. Pat. No. 3,442,927 describes a process for preparing fluoroxy compounds by the direct reaction, in a discontinuos manner, of fluorine with perfluoroalkyl compounds containing oxygen of the carbonyl or carboxylic type, at temperatures ranging from $-200°$ to $+50°$ C. The products are isolated from the reaction mixture by fractional condensation using glycerine-cooled separators. Such a separation is one of the most apparent drawbacks of such a process. Furthermore, the products are hypofluorites characterized by a non-perfluoropolyether perfluoroalkyl chain and they have a carbon atom in position with respect to the group $-OF$.

Data on hypofluorites with oxygen atoms in position with respect to the group $-OF$ are very scarce in the literature. No mention is made of hypofluorites having a structure $ROCF_2OF$ (R indicating, in this case, any organic radical).

Among the compounds having a similar structure there are known $CF_3OOCF_2OF$ and $CF_3CF(CF_3)OOCF_2OF$ described in the already cited U.S. Pat. No. 3,442,927.

It has, surprisingly, been discovered that it is possible to prepare thermally stable mono- or bis-hypofluorite compounds having a perfluorooxyalkylene structure and an oxygen atom in position with respect to the group $-OF$ by a process consisting or consisting essentially of reacting with fluorine in the liquid phase, preferably in the presence of an inert fluorinated solvent, at a temperature ranging form $-60°$ to $+30°$ C., and preferably from $-40°$ C. to $+20°$ C., in the presence of UV radiation, a perfluoropolyether containing fluoroformate end groups or containing one or more peroxy groups of the type $-OCF_2OOCF_2O-$ in the polyether chain.

Thus one object of the present invention is perfluoropolyether compounds having a hypofluorite end group of the formula:

$$R_fOCF_2OF$$

wherein $R_f$ is a perfluoropolyether group selected from the following classes:

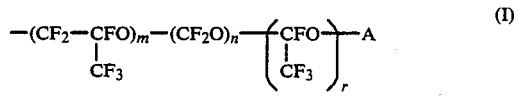  (I)

  (II)

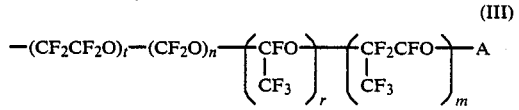  (III)

wherein A is $-CF_3$, $-C_2F_5$, $-C_3F_7$, $-CF(CF_3)_2$; m, r are integers higher than zero and lower than 50; n is an integer higher than or equal to zero and lower than 50; t, p are integers higher than zero and lower than 200; the above-indicated perfluoroalkylene units with indexes m, n, r, t and p being statistically distributed along the perfluoropolyether chain.

Another object of the present invention is perfluoropolyether compounds having two hypofluorite end groups of the formula:

$$FOCF_2OR'_fCF_2OF$$

wherein $R'_f$ is a perfluorooxyalkylene group selected from the following classes:

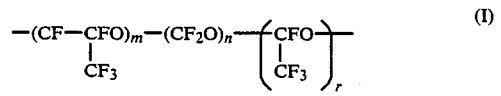  (I)

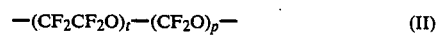  (II)

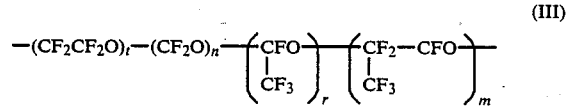  (III)

where m, r are integers higher than zero and loer than 50; n is an integer higher than or equal to zero and lower than 50; t, p are integers higher than zero and lower than 200; the perfluorooxyalkylene units with indexes m, n, r, t and p indicated hereinabove being statistically distributed along the perfluoropolyether chain.

Particularly significant and interesting perfluoropolyethers with one or two hypofluorite end groups represented by the above-indicated formulas are for example:

$$FOCF_2O(CF_2CF_2O)_t(CF_2O)_pCF_2OF \quad (1),$$

and $$CF_3O(CF_2CF_2O)_t(CF_2O)_p-CF_2OF \quad (2)$$

The mono- and bis-hypofluorites of the present invention are utilized for preparing fluorinated vinylethers.

In fact, as is well known, the hypofluorites are capable of reacting with fluorinated olefins which, by subsequent reactions, may be converted into other functional groups such as, for example, fluorinated vinylethers.

The fluorinated mono- and bis-vinylethers thus obtained may be utilized as monomers and co-monomers in the preparation of polymeric substances (see for instance U.S. Pat. No. 3,450,684).

The bis-hypofluorites are utilizable in the preparation of the corresponding bis-vinylethers. The preparation of the adducts with fluorinated olefins as precursors for vinylethers may be effected directly on the reaction mixture containing the inert reaction solvent, since the conversion of the starting product is generally complete and the hypofluorite yield is very high.

Another object of the present invention is a process for preparing perfluoropolyethers having fluoroformate end groups starting from a product obtained from the photochemical oxidation of $C_2F_4$ and/or of $C_3F_6$ containing peroxy groups, which process comprises treating said photochemical oxidation product by means of UV radiation having a wave-length ranging from 200 to 500 nm, in an oxygen stream at a temperature of from $-40°$ to $0°$ C.

The photochemical oxidation of $C_2F_4$ and/or of $C_3F_6$ is well known and broadly described in the literature; for example in British patents Nos. 1,104,482; 1,153,306; 1,189,339; 1,217,871 and in U.S. Pat. No. 3,242,218, and it leads to perfluoropolyether products containing peroxy groups.

The process of the present invention leads to the formation of perfluoropolyether products containing perfluoroformate end groups, which may be converted, by means of a further treatment, to hypofluorite end groups.

The perfluoropolyethers having fluoroformate end groups may be obtained, in the photosynthesis step, at low concentrations, and by heat-treatment at a temperature higher than 150° C. they are converted to acylic or ketonic fluorides according to the reactions:

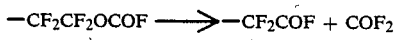

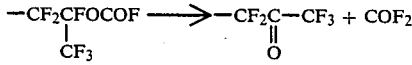

It has, surprisingly, been discovered that when the synthesis peroxy product is irradiated with UV radiation under an oxygen flow at a temperature ranging from $-40°$ to $0°$ C., and preferably from $-30°$ to $-20°$ C., it is possible to obtain perfluoropolyethers having fluoroformate end groups at a high concentration (higher than 80%). In order to have a high concentration of this end group it is advisable that the reaction should proceed for rather long times, of the order of 200 hours. The starting peroxy rough product utilized in the process for preparing perfluoropolyethers having fluoroforemate end groups is preferably diluted in an inert solvent such as, for example, straight chain or cyclic perfluorinated ethers or hydrocarbons.

The perfluoropolyethers having fluoroformate end groups obtainable by the process of the present invention, in spite of a decrease in the peroxy content of the precursor rough product, still have peroxy groups distributed along the perfluoropolyether chain. Such residual groups may be almost completely removed after stripping of the solvent, by irradiation with U.V. at a temperature of about 40° C.

The perfluoropolyethers having fluoroformate end groups according to the process of the present invention are utilized as precursors for the preparation of the above-described mono- and bis-hypofluorite perfluoropolyethers by reaction, in the liquid phase, with fluorine at a temperature ranging from $-60°$ to $+30°$ C., and preferably from $-40°$ to $-20°$ C., in the presence of UV having a wave-length ranging from 200 to 500 nm, and preferably from 300 to 500 nm.

In order to better control the reaction it is advisable to utilize a perfluorinated solvent such as perfluorocarbons or perfluoropolyethers such as GALDEN R D80 or Galden R FC75) and to dilute the fluorine flow with an inert gas, such as nitrogen.

The maximum yield of perfluoropolyether having a hypofluorite end group is obtainable, after having adjusted the temperature, in relation to the reaction times and to the wave-length of the UV radiation utilized.

Those skilled in the art may easily determine the proper conditions on the basis of the teaching contained in the present disclosure.

Operating for much longer times than those corresponding to the maximum yield leads, as has been found, to a decrease in hypofluorite. For example, at $-40°$ C. and using UV of a wave-length ranging from 200 to 500 nm it is preferable to operate for times not exceeding 200 hours. Conversely, when operating at $-40°$ C. but using a beam having a narrower $\lambda$ (300-500 nm), it is preferable to use reaction times not exceeding 60 hours.

High temperatures hinder the desired reaction to hypofluorite.

The use of a beam having a wave-length from 300 to 500 nm is preferred because, although it causes a decrease in the reaction rate to hypofluorite, due to a lesser concentration of the F radical, there is a drastically reduced dissociation of the hypofluorite end group and leads to practically complete conversions with a very high hypofluorite yield, i.e. higher than 80%.

Another process for preparing mono- and bis-hypofluorite perfluoropolyethers—which represents a further aspect of the present invention—comprises reacting perfluoropolyethers containing almost exclusively the peroxy group $-OCF_2OOCF_2O-$ with fluorine in the liquid phase, at a temperature ranging from $-60°$ to $+40°$ C. in the presence of UV irradiation having a wave-length ranging from 200 to 500 nm.

Perfluoropolyethers with high content of peroxide of the type $-OCF_2OOCF_2O-$ are obtained by irradiating, at a wavelength from 200 to 500 nm in an $O_2$ flow at temperatures ranging from $-70°$ to $-40°$ C., synthesis peroxy products such as, for example, those described in the above-cited patents.

By the process described hereinabove it is possible to obtain perfluoropolyethers containing the peroxy group $-OCF_2OOCF_2O-$, where this group represents more than 95% of the total peroxy content.

For preparing high-purity hypofluorites it is prepferable to use as a starting material a perfluoropolyether containing fluoroformate groups, because the conversion of these end groups is total.

In this manner it is possible to obtain a higher hypofluorite/peroxy group ($CF_2CF/OO$) ratio than is obtainable starting from a peroxy product. In any event, the peroxy precursor is to be preferred when the presence of peroxy does not influence the utilization of the product, for example as a fluorinating agent, and when its selective removal is carried out after the conversion of the hypofluorite group to a proper functional group.

If hypofluorite perfluoropolyethers are to be prepared from fluoroformate precursors, it is preferable to utilize, as starting materials, perfluoropolyethers having a high content of peroxy groups —$OCF_2OOCF_2O$—, in order to obtain high yields of bis-hypofluorites.

The following examples are given merely to illustrate the present invention without being however a limitation thereof.

EXAMPLE 1

A 35% by weight solution, in perfluorohexane, of a PFPE from TFE having a viscosity of 960 cSt at 20° C. and a peroxy power equal to 1.5 g of active oxygen/100 g, was introduced into a photochemical reactor having a 1-liter capacity, equipped with a quartz sheath for housing a Hg vapor lamp, type Hanau TQ 150, equipped with a bubbler and with a system for the thermoregulation of both the reactor and the sheath system. The reactor was conditioned at a temperature of −30° C. and the product was irradiated with a continuous oxygen flow for a total time of 200 hours. At the end, the discharged product exhibited a viscosity of 28 cSt at 20° C. and a residual peroxy power of 0.8. The removal of the residual peroxide was obtained, after stripping of the solvent, by irradiation at a temperature of 40° C.

The final product had a viscosity of 17 cSt at 20° C. and an average molecular weight, determined by NMR $^{19}F$, of 2300 and contained 83% of the end group —OCOF, 10% of the end group —$OCF_3$ and 7% of the end group —$OCF_2Cl$, wherefrom it follows that about 70% of the molecules were difunctional with respect to —OCOF.

EXAMPLE 2

Into a photochemical reactor having a 1-liter volume, cooled to −42° C., there were charged 700 g of a peroxy rough product obtained from TFE having $\eta_{20}=9760$ cSt and an oxidizing power (O.P.)=1.5 g of active oxygen/100 g of product and 1300 g of $CCl_2F_2$.

The above mixture, maintained at a temperature of −40° C., was irradiated by a U.V. lamp type Hanau TQ 150, in an oxygen flow of 150 l/h.

Samplings and NMR analyses carried out at regular intervals permitted one to follow the decrease of the —$OCF_2CF_2OO$— structure and the simultaneous increase of the —$OCF_2OO$— structure. After a 108 hour irradiation, the structure —$OCF_2CF_2OO$— had practically disappeared.

After evaporatin of the solvent, from the reactor were discharged 630 g of a product having $\eta_{20}=624$ cSt, containing a peroxy structure only of the type —$OCF_2OOCF_2O$—, the oxidizing power being equal to 1.0 g of active $O_2$/100 g of oil.

EXAMPLE 3

A solution at 10% by weight of the product prepared as described above in Example 1, in perfluoroheptane, was charged into a photochemical reactor having a maximum volume of 180 cc and an optical path of 6.5 mm, equipped with quartz sheaths for housing a mercury varpour lamp, type Hanau TQ 150, and furthermore equipped with a bubbler, a magnetic stirrer, a $CO_2$ trap, and a thermoregulation system for both the reactor and the sheath system.

After thermoregulation of the reaction system at −40° C. and lighting of the lamp, a fluorine flow of 5 Nl/h was conveyed into the reactor.

The reaction trend was followed by drawing small amounts of solution and by NMR $^{19}F$ analysis of the product, after having removed the solvent.

After a 12-hour reaction, the product was shown to contain 0.14 mmols/g oil of end groups of the type —OCOF, 0.57 mmols/g oil of hypofluorite end groups —$OCF_2OF$, 0.07 mmols/g oil of trifluoromethyl end groups —$OCF_3$ and 0.10 mmols/g oil of peroxy groups of the type —$OCF_2OO$—, the conversion to hypofluorite being therefore equal to 71.25%.

After a further 10.5-hour reaction, the product was quantitatively discharged and proved to be free from fluoroformate end group —OCOF— and to contain 0.59 mmols/g oil of hypofluorite end groups —$OCF_2OF$, 0.09 mmols/g oil of end groups —$OCF_3$, and 0.18 mmols/g oil of peroxy groups —$CF_2OO$—; it therefrom following that the conversion to hypofluorite was 74%.

The product has a molecular weight of 2950 and a functionality of 1.65.

The results are summarized in Table 1.

TABLE 1

| time (h) | end group —OCOF mmols/g oil | end group —$OCF_2OF$ | end group —$OCF_3$ | group —$OCF_2OO$— | end groups —$OOCF_3$ |
|---|---|---|---|---|---|
| 0 | 0,8 | — | — | — | — |
| 5 | 0.45 | 0.32 | 0.04 | 0.05 | t |
| 12 | 0.14 | 0.57 | 0.07 | 0.10 | t |
| 18.5 | 0.04 | 0.59 | 0.09 | 0.14 | t |
| 22.5 | t | 0.59 | 0.09 | 0.18 | t | temperature = −40° C.; t = traces.

EXAMPLE 4

In a photochemical reactor like that described in Example 3, but equipped with a Pyrex sheath for housing the lamp in order to utilize only radiations from 300 to 400 nm, a test was carried out under the same reaction conditions and following the same operating procedures. After a 20-hour reaction, the product proved to contain 0.24 mmols/g oil of end groups —OCOF, 0.46 mmols/g oil of hypofluorite end groups —$OCF_2OF$, 0.10 mmols/g oil of trifluoromethyl end groups —$OCF_3$, and 0.07 mmols/g oil of peroxy groups —$OCF_2OO$—.

After having carried out the reaction for a further 38 hours, the reaction product was quantitatively discharged and subjected to analysis, thus revealed still 0.07 mmols/g oil of fluoroformate end groups —OCOF, 0.66 mmols/g oil of hypofluorite end groups —OCF$_2$OF, 0.10 mmols/g oil of trifluoromethyl end groups, and 0.06 mmols/g oil of peroxy groups —OCF$_2$OO—. The conversion to hypofluorite was therefore equal to 82.5%. The product had a molecular weight of 2560 and a functionality of 1.66.

The results are summarized in Table 2.

TABLE 2

| time (h) | end group —OCOF mmols/g oil | end group —OCF$_2$OF | end group —OCF$_3$ | group —OCF$_2$OO— | end groups —OOCF$_3$ |
|---|---|---|---|---|---|
| 0 | 0.8 | — | — | — | — |
| 6 | 0.35 | 0.19 | 0.07 | 0.05 | — |
| 20 | 0.24 | 0.48 | 0.1 | 0.07 | — |
| 36 | 0.12 | 0.61 | 0.1 | 0.08 | — |
| 58 | 0.07 | 0.62 | 0.1 | 0.08 | — | temperature = $-40°$ C.

EXAMPLE 5

In a photochemical reactor like that described in Example 3, a test was carried out according to the same operating procedures, but at a temperature of $-20°$ C. After a 14.5 hour reaction, the product contained 0.04 mmols/g oil of fluoroformate end groups —OCOF, 0.52 mmols/g oil of hypofluorite end groups —OCF$_2$OF, 0.12 mmols/g oil of trifluoromethyl end groups —OCF$_3$, and 0.13 mmols/g oil of peroxy groups —OCF$_2$OO—.

After a 20.5 hour reaction, the test was stopped and the product was quantitatively recovered.

Subjected to analysis, the product revealed the disappearancew of the fluoroformate end groups and the presence of 0.52 mmols/g oil of hypofluorite end groups —OCF$_2$OF, 0.15 mmols/g oil of trifluoromethyl end groups —OCF$_3$, and 0.16 mmols/g of peroxy groups —OCF$_2$OO—. The product had a molecular weight of 2860 and a functionality of 1.47.

Figure 1A:
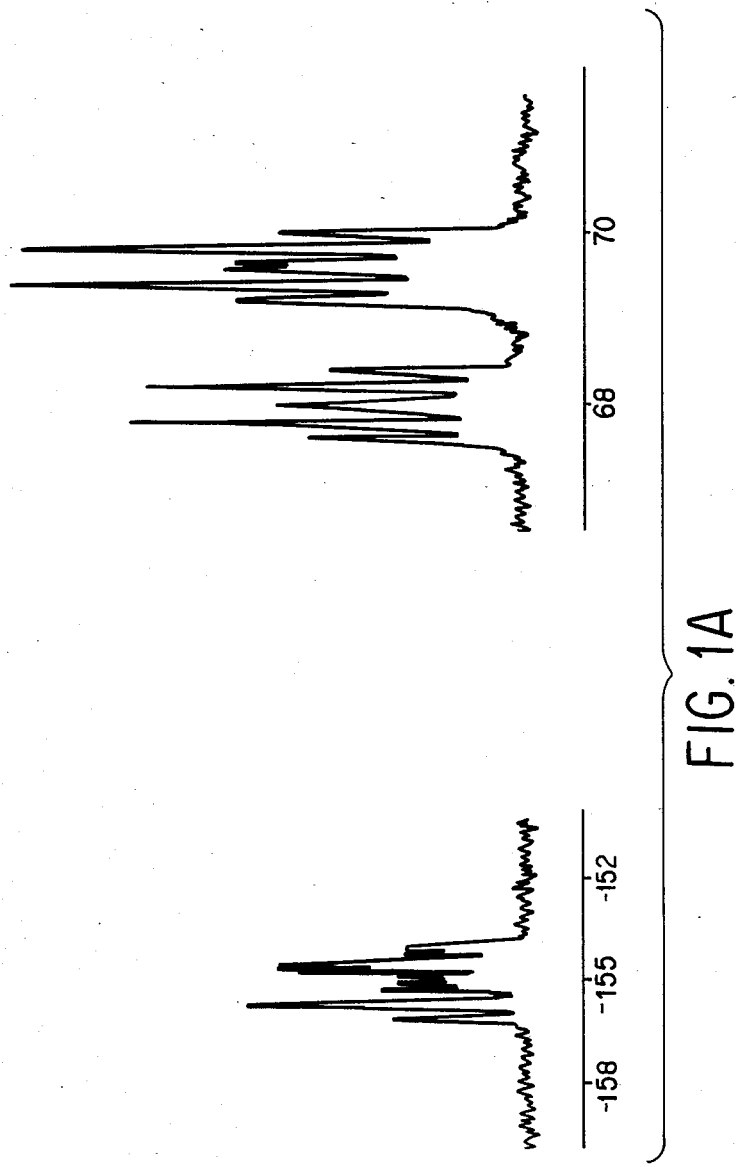

The $^{19}$F NMR pattern (60 MHz) of the product is shown in FIGS. 1 and 1a. There are evident two types of —OF end groups, characterized by the following parameters:

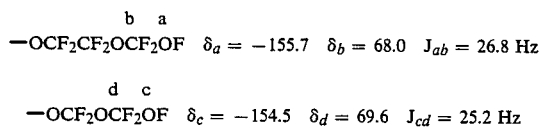

—OCF$_2$CF$_2$OCF$_2$OF   $\delta_a = -155.7$   $\delta_b = 68.0$   $J_{ab} = 26.8$ Hz —OCF$_2$OCF$_2$OF   $\delta_c = -154.5$   $\delta_d = 69.6$   $J_{cd} = 25.2$ Hz The results are reported in Table 3.

TABLE 3

| time (h) | end group —OCOF mmols/g oil | end group —OCF$_2$OF | end group —OCF$_3$ | group —OCF$_2$OO— | end groups —OOCF$_3$ |
|---|---|---|---|---|---|
| 0 | 0.8 | — | — | — | — |
| 7.5 | 0.21 | 0.43 | 0.1 | 0.11 | t |
| 14.5 | 0.04 | 0.52 | 0.12 | 0.13 | t |
| 20.5 | 0.00 | 0.52 | 0.15 | 0.16 | t | temperature = $-20°$ C., t = traces.

EXAMPLE 6

In a photochenical reactor like that described in Example 3, a test was carried out according to the same operating procedures, but a temperature of $+10°$ C. After a 5-hour reaction, the reaction product was quantitatively recovered and, subjected to analysis, it was shown to contain no longer fluoroformate end groups —OCOF, while there were present 0.27 mmols/g oil of hypofluorite end groups —OCF$_2$OF, 0.44 mmols/g oil of trifluoromethyl end groups —OCF$_3$, 0.03 mmols/g oil of end groups of type —OOCF$_3$, and 0.12 mmols/g oil of peroxy end groups —OCF$_2$OO—.

The product exhibited a molecular weight of 2550 and a functionality of 0.7.

The results are summarized in Table 4.

TABLE 4

| time (h) | end group O—COF mmols/g oil | end group —OCF$_2$OF | end group —OCF$_3$ | group —OCF$_2$OO— | end groups —OOCF$_3$ |
|---|---|---|---|---|---|
| 0 | 0.8 | — | — | — | — |
| 3 | 0.16 | 0.32 | 0.28 | 0.1 | 0.02 |
| 5 | 0 | 0.27 | 0.44 | 0.12 | 0.03 | temperature = $-10°$ C.

EXAMPLE 7

Into a photochemical reactor, as described above in Example 3, a 10% solution, in perfluorohexane, of PFPE obtained from TFE, having a molecular weight of 13,000, containing peroxy groups of the type —OCF$_2$OOCF$_2$O— (1.2 mmols/g of oil), fluoroformate end groups —OCOF (0.03 mmols/g of oil), and trifluoromethyl end groups —OCF$_3$ (0.03 mmols/g of oil), was charged. The reaction was conducted according to the same procedures and under the same operating conditions as in Example 3.

After a 10-hour reaction, an analysis of the product revealed the disappearance of fluoroformate end groups —OCOF, a content of hypofluorite end groups —OCF$_2$OF of 0.27 mmols/g of oil, 0.09 mmols/g oil of trifluoromethyl end groups —OCF$_3$, and 0.97 mmols/g oil of peroxy groups —OCF$_2$OO—, and having a molecular weight of 5140.

The reaction was carried out for a further 45 hours. The discharged product then contained 0.56 mmols/g oil of hypofluorite end groups, 0.11 mmols/g oil of trifluoromethyl end groups, and 0.54 mmols/g oil of peroxy groups —OCF$_2$OO—, having a molecular weight of 2830 and a functionality of 1.7.

EXAMPLE 8

A portion of the sample of product obtained in Example 5 was additioned with H$_2$O and kept at room temperature for 37 days. After that time the sample proved to be stable to analysis; NMR analysis and a iodometric titration provided an O.P. value respectively of 0.96 and 0.91 g of active oxygen/100 g of product, equal to the starting value.

The same sample, after heating to 90° C. for 7 hours, was still stable to analysis.

EXAMPLE 9

A portion of the sample of product obtained in Example 5 was dissolved in n-perfluoroheptane and introduced into a flask equipped with a bubbler, from which SO$_2$ was fed at a temperature of 20° C. No reaction was revealed by the NMR analysis. The treatment was repeated at a temperature of 80° C.

At the end of the test the hypofluorite end groups —OCF$_2$OF were shown to have been converted to end groups —OSO$_2$F ($^{19}$F NMR: δ=−48.3; IR: η=1495 cm$^{-1}$).

EXAMPLE 10

Portions of the product obtained according to Example 5 were introduced into glass vials and heated under the conditions indicated in Table 5.

TABLE 5

| Sample | Temperature °C. | Time (h) |
|---|---|---|
| 1 | 170 | 1 |
| 2 | 170 | 2 |
| 3 | 280 | 1 |
| 4 | 180 | 2 |

Samples 1, 2 and 3 exhibited a 20% reduction in the hypofluorite content, while in sample 4 hypofluorite was no longer present.

EXAMPLE 11

A portion of the product obtained in Example 4 was dissolved in n-perfluorohexane and introduced into a reactor equipped with a magnetic stirrer, a bubbler, and a thermoregulation system.

Tests were conducted at a temperature of −60° C. with various olefins (utilized in excess with respect to hypofluorite 2:1). After addition of the monomer, the reaction mixture was maintained at room temperature for about 1 hour. The reaction products were obtained with yields of 80–100% in all cases. The structures of the obtained adducts and the relevant yields of the two isomers revealed by NMR $^{19}$F analysis are reported in Table 6.

TABLE 6

| olefin | adduct | % |
|---|---|---|
| C$_3$F$_6$ | —OCF$_2$CF$_2$CF$_3$ | 65 |
|  | —OCF(CF$_3$)$_2$ | 35 |
| C$_2$F$_4$ | —OCF$_2$CF$_3$ | — |
| C$_2$F$_3$Cl | —OCF$_2$CF$_2$Cl | 77 |
|  | —OCFClCF$_3$ | 23 |
| CFClCFCl | —OCFClCF$_2$Cl | — |
| CH$_2$CF$_2$ | —OCH$_2$CF$_3$ | 64 |

TABLE 6-continued

| olefin | adduct | % |
|---|---|---|
|  | —OCF$_2$CH$_2$F | 36 |
| C$_2$F$_3$OCF$_2$CF$_2$Br | —OCF$_2$CF$_2$OC$_2$F$_4$Br | 75 |
|  | —OCF(CF$_3$)o C$_2$F$_4$Br | 25 |
| CF$_2$CF—CFCF$_2$ | —OCF$_2$=CF=CF—CF$_3$ | — |

What is claimed is:

1. Perfluoropolyethers haing a hypofluorite end group of the formula:

R$_f$OCF$_2$OF where R$_f$ is a perfluoropolyether group selected from the following classes:

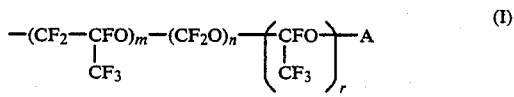

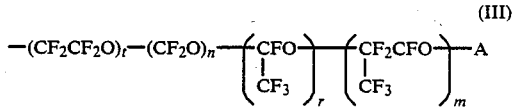

in which A is —CF$_3$, —C$_2$F$_5$, —C$_3$F$_7$, —CF(CF$_3$)$_2$, m, r are integers higher than zero and lower than 50, n is an integer from 0 to 50, t, p are integers higher than zero and lower than 200; the perfluoroalkylene units indicated above with indexes m, n, r, t and p being randomly distributed along the perfluoropolyether chain.

2. Perfluoropolyethers having two hypofluorite end groups of the formula:

FOCF$_2$OR'$_f$CF$_2$OF wherein R'$_f$ is a perfluoro-oxyalkylene group selected from the following classes:

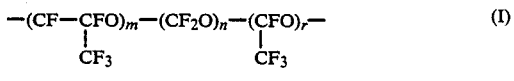

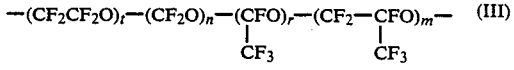

in which m, r are integers higher than zero and lower than 50; n is an integer higher than or equal to zero and lower than 50; t, p are integers higher than zero and lower than 200; the perfluorooxyalkylene units with indexes m, n, r, t and p being randomly distributed along the perfluoropolyether chain.

3. Perfluoropolyethers having hypofluorite end groups, of the formula:

FOCF$_2$(OCF$_2$CF$_2$)$_t$(OCF$_2$)$_p$OCF$_2$OF, or

CF$_3$(OCF$_2$CF$_2$)$_t$(OCF$_2$)$_p$OCF$_2$OF wherein t and p are integers higher than zero and lower than 200.

* * * * *